Oct. 20, 1925.
R. N. CHAMBERLAIN
1,558,076
INDICATING DEVICE FOR STORAGE BATTERIES
Filed April 18, 1924      2 Sheets-Sheet 1
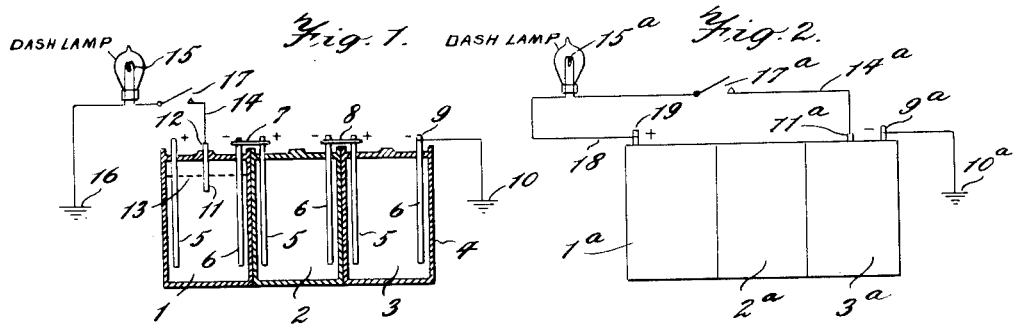
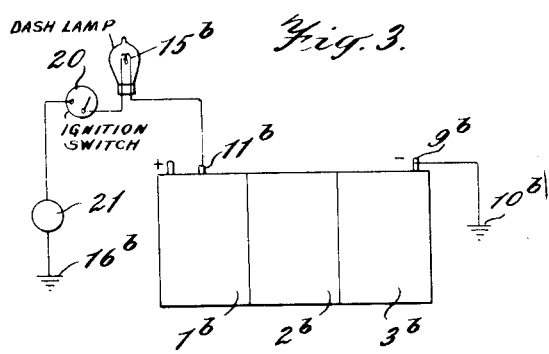
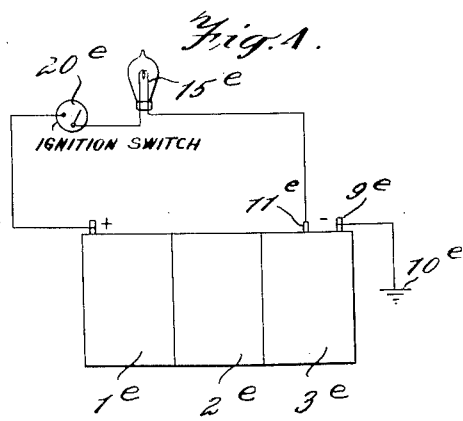

Oct. 20, 1925.  1,558,076
R. N. CHAMBERLAIN
INDICATING DEVICE FOR STORAGE BATTERIES
Filed April 18, 1924    2 Sheets-Sheet 2
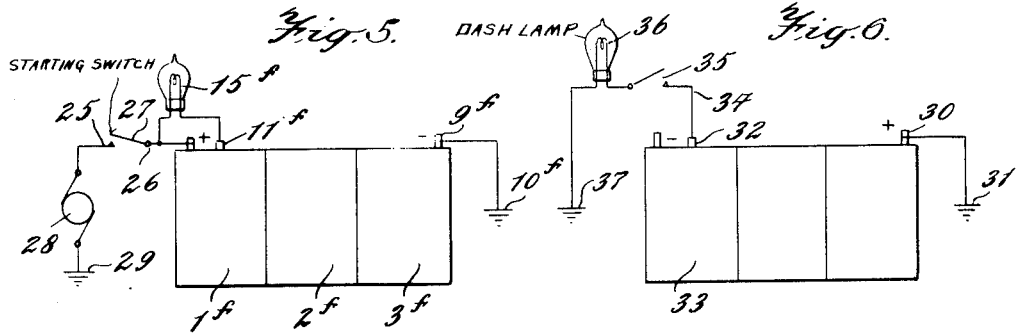
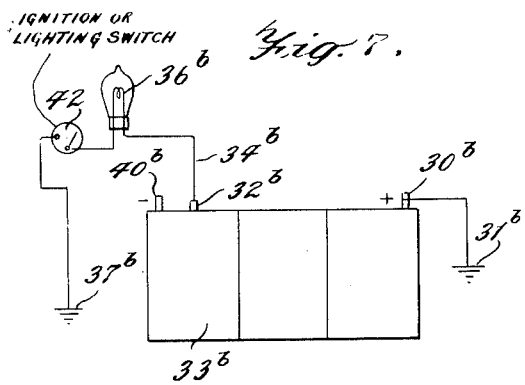
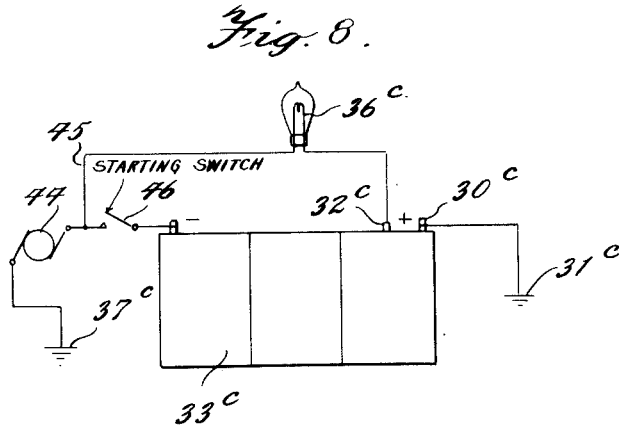

Patented Oct. 20, 1925.

1,558,076

UNITED STATES PATENT OFFICE.

RUFUS N. CHAMBERLAIN, OF CHICAGO, ILLINOIS.

INDICATING DEVICE FOR STORAGE BATTERIES.

Application filed April 18, 1924. Serial No. 707,402.

*To all whom it may concern:*

Be it known that I, RUFUS N. CHAMBERLAIN, a citizen of the United States, residing at Chicago, county of Cook, State of Illinois, have invented a new and useful Improvement in Indicating Devices for Storage Batteries, of which the following is a specification.

My invention relates to indicating devices for storage batteries and is used for the purpose of giving an indication when the level of the electrolyte of the battery falls below a predetermined point. The necessity for thus maintaining the electrolyte level will be apparent to those skilled in the art.

I have devised a very simple arrangement which is entirely dependable and which may easily be applied to batteries already in service without modification of the batteries, and at little expense. I have also devised a device which includes preferably a normally open circuit, and in the application of this device no element foreign to the composition or construction of the batteries is introduced.

In devices of this character it is necessary that there should not be any constant drain of the battery energy; nor that there should be introduced into the battery any element which would induce any chemical action or produce any substance which has a deleterious effect or action upon any elements of the battery. If any of the foregoing is present, it becomes impossible to secure the approval of the storage battery manufacturers or the automobile makers, without which such devices will not be applied to new or old batteries.

My invention will be better understood by reading the following description taken in connection with the accompanying drawings showing modifications embodying my invention, and in which:

Fig. 1 illustrates diagrammatically a 3-cell storage battery with the preferred form of my invention applied thereto, the battery being in section;

Fig. 2 shows a side elevation of a 3-cell storage battery with a modification of my invention applied thereto;

Fig. 3 is a view similar to Fig. 2, showing a modification of my invention;

Fig. 4 is a view similar to Fig. 2 showing a modification of my invention;

Fig. 5 is a view similar to Fig. 2 showing a modification of my invention;

Fig. 6 is a view similar to Fig. 2 showing a modification of my invention;

Fig. 7 is a view similar to Fig. 2 showing a modification of my invention; and

Fig. 8 is a view similar to Fig. 2 showing a modification of my invention.

Fig. 1 shows a preferred embodiment of my invention. The battery comprises cells 1, 2 and 3 which may be of any well-known construction. Each of these cells consists of a container 4, the usual positive and negative plates which are omitted from the drawing to more clearly illustrate my invention, terminal of a positive plate assembly 5 and terminal of a negative plate assembly 6. The plate assemblies of the cells are connected in series by connectors 7 and 8. In Figure 1 the negative terminal 9 of the battery is grounded at 10, corresponding to the usual practice in automobile construction. An intermediate electrode 11 is placed through the usual vent cap 12, or it may be placed through any other aperture in the cell cover, and extends into the positive cell 1 a short distance below the normal level of the electrolyte, the said normal level being indicated by the dotted line 13.

A wire 14 connects the electrode 11 with the usual dash lamp 15 of an automobile. The other side of the lamp 15 is grounded at 16, thus connecting the other side of the circuit to the negative terminal 9 of the battery. The usual dash switch 17 which may or may not be incorporated in the dash lamp holder or socket, is placed in the indicator circuit, and is normally open so that the indicator circuit 11, 14, 17, 15, 16 and 9 is open and no energy is taken from the battery. When it is desired to test the battery to see if the electrolyte is not below a predetermined level, the switch 17 is closed and if the electrolyte is in engagement with the electrode 11 the lamp 15 will be lighted, thus indicating to the operator that the level of the electrolyte is not below the predetermined point which corresponds to the end of the electrode 11. Thus the position of the electrode 11 in the cell established the predetermined point at which the electrolyte may recede before the indicator circuit is broken.

The voltage between the electrode 11 and the negative terminal 9 of the battery is approximately from three to four and one-half volts. This variation of course depends upon the state of charge of the battery and the conditions under which it is operating. In the ordinary operation of an automobile, the dash light will be used in the normal way which is often enough to apprise the operator of the level of the electrolyte. That is to say, if the dash switch 17 is closed to light the dash lamp 15 in the ordinary way, the said lamp will light provided the electrolyte is not too low. Upon lighting, the lamp indicates to the operator that the electrolyte level is at a satisfactory height. If the lamp should fail to light on the closing of the switch 17, the operator would be advised that the electrolyte level is too low and it would therefore be necessary in order to avoid damage to the battery cells, and to regain the use of the dash lamp, to fill the battery to the proper level.

Where desired, and where a more rapid decline of the electrolyte takes place in the middle cell of a battery, due to restricted radiating surfaces and therefore higher internal temperatures, I insert the intermediate electrode in that cell, in which case the voltage between the intermediate electrode and the positive terminal of the cell on one side, and the negative terminal of the cell on the other side will vary from one to three volts according to conditions obtaining in the electrical circuit of the battery. In this case a standard three to four volt lamp may be used, and while the illumination may not be sufficient for the purpose of serving as the usual dash lamp, it is sufficient for use as an indicator, and where a meter type of indicator is used, the electrical design can be made to conform to the voltages of the electrode circuit and thus to operate in an entirely satisfactory manner.

Special lamps may be manufactured to operate on the voltages of the electrode circuit when the electrode is placed in the middle cell so as to give the same illumination as is now secured from the usual dash lamp, but I prefer the arrangement wherein standard lamps are used.

The indicator and electrode circuits shown in the accompanying drawings would not be affected or changed in principle by inserting the electrode in the middle cell.

I have found that the best results are secured by the use of antimonial lead as the composition for the electrode 11, though lead alone can be used. Practically all automobile batteries are of the well-known pasted type consisting of a grid of antimonial lead having pockets in which is pasted lead oxide, known as the active material of the battery plate. The grid does not actively enter into the battery capacity, but merely supports the active material and acts as a conductor through which the current passes to the terminals of the battery. By the use of an intermediate electrode of antimonial lead it will therefore be apparent that I am using the same materials as that of which the plate grids are composed. I have found that carbon may be used as an intermediate electrode with entirely satisfactory results and without injury to the battery, but I prefer to use antimonial lead. Carbon also would not introduce any foreign substance into the cells of the battery, as many storage battery manufacturers use lampblack (carbon) in the negative paste material.

By placing the electrode in the cell, the positive terminal of which is free, said electrode takes a negative polarity, thereby being maintained clean and conductive at all times, so that upon the instant closure of the electrode indicating circuit the lamp or other indicating device will immediately operate provided the electrolyte is in contact with the intermediate electrode. For this reason I prefer to place the intermediate electrode in cell 1 instead of in cell 3.

In the modification shown in Fig. 2, the parts are numbered the same as those of Fig. 1, but have the exponent "a" applied thereto. In this arrangement the intermediate electrode 11$^a$ is placed in the cell 3$^a$ having the negative terminal free, and a circuit leads from the electrode 11$^a$ through a wire 14$^a$, switch 17$^a$, lamp 15$^a$ and wire 18 to the positive terminal 19 of the cell 1$^a$. The negative terminal 9$^a$ is grounded at 10$^a$. In this modification with the electrode in the cell having the free negative terminal, a film of lead peroxide is formed on said electrode during the time that the indicating circuit is closed. So long as the circuit remains closed this film permits the flow of current so as to maintain the lamp 15$^a$ at normal brilliancy. If the indicating circuit is interrupted and the intermediate electrode with the peroxide film thereon is permitted to remain open-circuited in the electrolyte of the cell 3$^a$, a film of lead sulphate is formed on the surface of the lead peroxide previously formed.

This lead sulphate has an insulating effect upon the electrode 11$^a$, so that after the indicating circuit has stood open for a period of from twelve to twenty-four hours or longer, it requires a considerable time for the establishment of a sufficient current through the indicating lamp to bring it to normal brilliancy. Unless the resistance of the indicating circuit, including that of the lamp, is relatively low, this resistance film will prevent the establishment of the indicating circuit within sufficient time to be practicable.

In fact, if the resistance of this circuit is too high, it is doubtful if sufficient current flow could be secured without removing the electrode 11$^a$ and cleaning the same. It is on account of the formation of this insulating film that I prefer to place the intermediate electrode in the cell having the positive free terminal, as shown in Fig. 1. As above stated, if the indicating circuit is maintained closed, the film of peroxide does not interfere with the current flow, but an equal objection resides in the fact that if the circuit is maintained closed, a constant drain is placed upon the battery, and whereas, the amount of current is slight it is nevertheless sufficient to completely discharge the battery. I have found by experiment that it is wholly impractical to use a normally closed circuit for the indicator-electrode circuit. If the circuit were made of sufficient resistance to cut down the flow of current so that substantial battery discharge would not be present, it would be of such high resistance that if the circuit were interrupted for any length of time, it certainly could not be again established within a period of time sufficient to serve the purpose covered by my invention.

The parts shown in Fig. 3 are numbered the same as those in Fig. 1, but have the exponent "b" applied thereto. In this modification the intermediate electrode 11$^b$ is placed in the cell having a free positive terminal and instead of using the dash switch for controlling the usual dash lamp as in Figs. 1 and 2, the ignition switch 20 is used, or if desired, the indicator circuit may be controlled by the usual lighting switch. In the foregoing arrangement, the switch closes the indicating circuit through the usual dash lamp 15$^b$ when the ignition is on. This means that so long as the engine is operating, the lamp, if lighted, will indicate that the battery electrolyte level is satisfactory, so that each time the motor is operated the operator is advised of the level of the electrolyte. If upon throwing the ignition switch on, the lamp did not light, the operator would know that his battery needed filling. The indicating circuit is completed through the ignition coil 21 or other grounding arrangement to ground 16$^b$. The negative terminal 9$^b$ is grounded at 10$^b$.

The modification in Fig. 4 is quite similar to that shown in Fig. 3 and the parts bear the same numbers except the exponent "e" is added thereto. In this embodiment the intermediate electrode 11$^e$ is in a cell having a free negative terminal and therefore instead of grounding the indicator circuit through the ignition system, it is connected directly to the positive terminal of the battery, parts of the lighting or ignition switch being used to control the circuit.

In the modification shown in Fig. 5 the parts shown are numbered the same as in Fig. 1, except that the exponent "f" is added thereto. In this arrangement the indicator circuit is connected through the switch operating the starting motor. The intermediate electrode is in a cell having a free positive terminal, and a separate indicator lamp is employed. A meter type of indicator may here be used also, but I prefer the lamp. The lamp is connected by a wire 24 to the contact 25 on the starting switch. A switch member 27, normally open, connects the contacts 25 and 26 of the starting motor switch and at the same time closes the indicator circuit through starting motor 28 to ground at 29. The lamp 15$^f$ is therefore lighted during the operation of the starting motor, and its circuit is automatically opened upon release of the starting motor switch, thus providing a fully automatic method of indicating the position of the electrolyte to the operator. In addition, practically no current is consumed by the indicator, it being understood that the starting switch is closed only infrequently and then for a very short period of time.

It will be noted that in all of the foregoing modifications the negative terminal of the battery is grounded. In the modifications shown in Figs. 6 to 8 the positive terminal of the battery is grounded. These modifications are shown in this way in order that the art may be fully instructed as to the application of my invention in its various forms to the batteries with the negative terminals grounded or with the positive terminals grounded. Some automobile manufacturers prefer to ground one terminal and some prefer to ground the other.

In the modification shown in Fig. 6, the positive terminal 30 is grounded at 31. The intermediate electrode 32 is placed in cell 33 having a free negative terminal. A wire 34 connects the electrode 32 with the dash switch 35. A dash lamp 36 is connected to the switch 35 which may also be incorporated in the dash lamp housing or socket, and to the ground at 37, so that upon closing the switch 35 the indicator circuit is closed and the lamp 36 lighted. In this modification the intermediate electrode is in the cell having a free negative terminal and therefore the indicator circuit must be of sufficiently low resistance so that the current will flow immediately upon closing the same, although the same necessity for immediate indication is not present in this modification as it is where the indicator circuit is closed through the starting switch, or where a spring switch is used.

In Fig. 7 the corresponding parts bear the same numbers as the parts of Fig. 6 except that the exponent "b" has been added thereto. The intermediate electrode is placed in the cell having a free negative terminal 33$^b$ and is connected to the usual dash lamp 36$^b$. The lamp may be operated by the ignition or lighting switch 42 and to ground at 37$^b$, either directly or through the ignition system. In this modification, as in that of Fig. 3, the indicator circuit is closed only when the engine is operating. As soon as the ignition or lighting switch is opened, the indicator circuit is interrupted. The resistance of this circuit is such that lamp 36$^b$ will come to full brilliancy shortly after the controlling switch is closed. In this embodiment a separate indicator lamp from that of the usual dash lamp may be used.

In the modification shown in Fig. 8 the parts are numbered the same as corresponding parts in Fig. 6 and have the exponent "c" added thereto. In this modification the intermediate electrode is in the cell having a free positive terminal and is connected to the dash lamp 36$^c$. The lamp is connected to the starting motor side of the starting motor switch 44 by wire 45. The starting switch 46 is connected to the negative terminal of the battery and when closed connects the starting motor 44 across the battery and at the same time closes the indicator circuit by connecting the wire 45 to the negative terminal of the battery. The intermediate electrode being in a cell having a free positive terminal, and hence having a negative electrical characteristic, is kept clean and immediately upon closing the indicator circuit the lamp will light, provided the electrolyte is not below the end of the intermediate electrode.

From the foregoing it will be evident that I have provided an indicator, particularly for automobile storage batteries, which is simple and positive in operation. In all instances where the automobile is provided with a dash lamp and switch either combined or separate, the only additional parts required for my invention are the intermediate electrode and a wire connecting same to the switch. In the preferred form of my invention the intermediate electrode is placed in the cell having a free positive terminal and for reasons already explained remains clean and highly conductive so as to give an immediate indication upon the closing of the indicator circuit. In those instances where the indicator circuit is closed for only a brief period, as for instance when completed through the switch of the starting motor, the intermediate electrode is placed in the cell having the free positive terminal so that it is kept clean to give an immediate indication to the operator of the electrolyte level each time the motor is started. In those instances where the intermediate electrode is placed in the cell having a free negative terminal, it is so connected that the circuit is closed for a considerable period of time, and a low resistance circuit is provided so that notwithstanding the formation of a sulphate insulating film on the intermediate electrode, the indicator, whether lamp or of the meter type, is operated to advise the operator that the level of the electrolyte is not below the end of the intermediate electrode. In each instance I have illustrated a 3-cell battery, because nearly all automobiles of the present date employ 3-cell batteries. There are one or more exceptions, however, where a 6-cell battery is used. Even in such cases the electrode may be inserted in a cell that will permit of an indicator circuit voltage that will permit of standard voltage lamps being used, and such embodiments will be substantially the equivalents of those shown for 3-cell batteries. Slight changes may be made in the arrangement of the parts without departing from the spirit of my invention.

This application is a continuation in part of my application, Serial No. 639,057, filed May 15, 1923.

I claim:

1. An electrolyte level indicator for an automobile storage battery comprising a signal, a circuit fed from said battery including said signal, means controlled by a predetermined level of electrolyte in said circuit at one point when the electrolyte is above a predetermined level and normally open circuit controlling means operating simultaneously with means connected with the normal operation of the automobile for closing said circuit at a second point.

2. The combination of a storage battery, a signal, a circuit for said signal including the battery and means inside the battery for opening the circuit at one point when the electrolyte of the battery falls below a predetermined level and means controlled by means actuated during the operation of the automobile for temporarily closing the circuit at a second point.

3. The combination of a storage battery, a double function signal operated through a circuit including the battery, means in the battery for controlling the circuit to cause said signal to perform one function dependent upon the level of the electrolyte of the battery and means on the car acting when operated for another function to complete the circuit for said signal.

4. An electrolyte level indicator for automobile storage batteries, including a storage battery having a plurality of cells connected in series, an intermediate electrode placed in one cell and extending to a predetermined point in the electrolyte chamber of said cell, an indicator, a circuit including the electrode, the indicator and the far or free terminal of a cell at least one cell removed from the electrode and intermittently operated means for operating the car or placing the car in operation and adapted when operated to close said circuit.

5. In an indicator for automobile storage batteries, the combination of a storage battery having a plurality of cells connected in series, an intermediate electrode of antimonial lead placed in one cell and extending to a predetermined point below normal level of the electrolyte in said cell, a lamp, a circuit including the electrode of antimonial lead, the lamp and the far or free terminal of a cell at least one cell removed from the electrode of antimonial lead and means used for another purpose in the operation of the automobile adapted when operated to control said circuit.

6. In an indicator for automobile storage batteries, the combination of a storage battery having a plurality of cells connected in series, an intermediate electrode of antimonial lead placed in one cell and extending to a predetermined point below the normal level of the electrolyte in said cell, a lamp, a circuit including the electrode of antimonial lead, the lamp and the free terminal of a cell at least one cell removed from the electrode of antimonial lead and means intermittently operated for other purposes in the operation of the car for controlling said circuit.

7. In a system of indicating the level of the electrolyte of storage batteries, the combination of a circuit including a battery, an antimonial lead electrode in a cell of the battery having a relative negative polarity and a lamp and means having another function in the operation of the automobile for controlling said circuit.

RUFUS N. CHAMBERLAIN.